United States Patent [19]

Moore et al.

[11] Patent Number: 4,896,273

[45] Date of Patent: Jan. 23, 1990

[54] METHOD AND APPARATUS FOR SELECTION OF COMPLEX PARTS, INCLUDING BLADES FOR BAND SAWS

[76] Inventors: Bill V. Moore, 304 Pinecroft Dr., Raleigh, N.C. 27609; John A. Jackson, 1289 Belfast St., Greenville, Miss. 38701

[21] Appl. No.: 79,062

[22] Filed: Jul. 29, 1987

[51] Int. Cl.⁴ .................... G06F 15/46; G05B 19/18
[52] U.S. Cl. ............................. 364/505; 364/474.21; 83/789
[58] Field of Search ................. 364/505, 474, 474.21, 364/551.02; 83/789, 802, 817

[56] References Cited

U.S. PATENT DOCUMENTS

| | | | |
|---|---|---|---|
| 4,530,046 | 7/1985 | Munekat et al. | 364/474 X |
| 4,534,085 | 4/1985 | Stewart | 83/817 X |
| 4,547,854 | 10/1985 | Hashimoto et al. | 364/474 |
| 4,739,488 | 4/1988 | Asakura | 364/474 |

Primary Examiner—Parshotam S. Lall
Assistant Examiner—Ellis B. Ramirez
Attorney, Agent, or Firm—Michael F. Heim

[57] ABSTRACT

A system is disclosed for selecting a band saw blade for a particular product to be cut on a selected band saw. Specifically, a schedule of predetermined parameters for operating most known types of band saws is entered into a microprocessor. The identity of the specific band saw and product to be cut it also entered. The microprocessor provides recommendations as to the optimum band saw blade for cutting the product. An additional feature of the invention is a system for providing a cost per-piece analysis of the product being cut, using both the present blade and the recommended blade. Further, a library of band saw problems and their recommend solution is provided. Finally, a product cross-reference schedule is provided in order to identify appropriate blades for a plurality of band saw brands.

20 Claims, 4 Drawing Sheets

STANDARD TOOTH

CLUSTER SET

SKIP TOOTH

EVERY TOOTH SET (E.T.S.)

VARIABLE PITCH

RAKER SET

VARIABLE PITCH 5-DEG. HOOK

HOOK TOOTH

WAVY SET

HOOK VARIABLE PITCH 4,896,273

METHOD AND APPARATUS FOR SELECTION OF COMPLEX PARTS, INCLUDING BLADES FOR BAND SAWS

BACKGROUND OF THE INVENTION

This application is a continuation in part of U.S. patent application Ser. No. 898,090, entitled "Apparatus and Method For Inspection and Testing of Industrial Power Saws or the Like," which is incorporated by reference as if set forth fully here. A microfiche appendix of 387 frames is included as a part of this application.

The present invention pertains to a method and means for selecting complex parts such as blades for industrial power saws. More particularly, a portable unit is provided that is operable to select an optimum choice of blades for band saws and the like, to analyze the cost of using a particular blade to produce a product, and to recommend solutions to problems experienced by users of band saws. The unit can be operated to select chains for chain hoists, wire wrapping machines for winding wire around electric terminals, and other such parts.

The operation of material cutting machines such as band saws, power hacksaws and other types of metal cutting apparatus is subject to performance requirements which should be frequently observed or reviewed to determine when the productivity of these machines has fallen beneath design or optimum levels. It is also possible that the operational condition of the machine may represent a safety hazard.

Industrial power band saws, for example, are often operated with an improper blade for the particular type of material being cut, a dull blade, or some other machine operating condition that is less than optimum. Because industrial power band saws and the like do not have the technical sophistication of a computer-controlled machine tool, they are often at the bottom of the routine maintenance priority list. This is unfortunate because the proper continued maintenance of a material cutting machine to assure operation at its optimal performance conditions can result in significant cost savings for a shop or factory owner.

Compounding the difficulty of improving the performance and operation of these material cutting machines is the fact that this type of equipment is often located in a factory setting where it may be placed in close proximity to other machine tools or busy material storage areas. Such locations make these machines difficult to analyze, to maintain and to service. Typically machines such as industrial power band saws are run until breakdown, then they are repaired and serviced.

It is normally the task of a saw sales engineer, maintenance engineer or plant industrial engineer to review the performance of a power saw in the actual working environment of the saw itself. Such an environment, in conjunction with the limited time normally available to perform necessary tests and performance evaluations does not lead to the type of thorough review and evaluation of saw operating conditions and performance necessary for an accurate analysis of all operating parameters. It is also desirable that the evaluation of the operating conditions and performance of a material cutting machine such as a power band saw or the like be presented in a format that is easy to use to provide a complete record of the operational history of the machine. Such a record facilitates machine life maintenance reviews and the planning of an effective maintenance program. It is to solve these problems of analyzing, recording and improving machine performance that the present invention has been developed. The apparatus that is used for analyzing machine performance is also adaptable for use with externally inserted data to select the optimum band saw for a particular set of operating conditions, to analyze the cost of using a particular blade, and to recommend solutions to problems involving band saws.

Accordingly, there is provided by the present invention an improved apparatus and method which will record and reproduce information regarding the operating condition and performance of a material cutting machine such as an industrial power saw and the like. Such apparatus and method is usable at the operating location of the material cutting machine and will produce, in a minimum amount of time, an easy-to-read record of the operational status of the machine for compiling an operational history and a programmed maintenance plan. The apparatus and method is also usable away from the operating location so that an operator of a band saw can enter parameters to enable the selection of an optimum blade for a given use, to analyze the costs of using particular blades, and to recommend solutions to problems experienced by such an operator.

SUMMARY OF THE INVENTION

The present invention provides an improved apparatus and method for assisting in the selection of an optimum saw blade for a given set of conditions, for analyzing the costs of using particular blades, and for recommending solutions to problems with band saws. The resulting information describes the operating conditions of industrial metal working machines, particularly industrial power band saws and power hacksaws.

In accordance with one aspect of the present invention, the apparatus is provided with means for calculating both the cross-sectional area of the workpiece, and the area cutting rate of the saw. Additionally, the apparatus will receive and store predetermined input data describing desired cutting rates for particular saw blades. For recordkeeping purposes, the apparatus provides the user with a record of operational data in printed form.

In accordance with another aspect of the present invention, there is provided an improved apparatus which may be hand carried to the location of an industrial cutting machine. Data regarding the operating conditions of the machine may be recorded and analyzed and then reproduced in the form of a printout before the operator of the apparatus ever leaves the operational area of the machine. In the alternative, data can be entered either automatically or manually at a location remote from the machine.

The apparatus of the present invention has been configured to mount in a compact carrying case along with a preprogrammed digital computing unit including a central processing unit, an operator-actuated keyboard, a document printer, and attendant visual displays of particular data generated during a test or evaluation process. The apparatus is configured to record and display such parameters as the actual time for a particular machine cycle or cutting cycle, the total number of cuts in a repeat cycle type test, the total time required for all cuts or machine cycles, the saw motor input current and a visual display of information provided to and being stored in the central processing unit.

In accordance with still a further aspect of the present invention, there is provided an improved apparatus for producing a printed report of a power saw operating condition. This report is based on certain saw operating parameters and material characteristics. Additionally, notice may be provided to the saw operator indicating possible hazards when cutting particular materials that are considered dangerous to cut with a particular saw for various reasons.

In accordance with still a further aspect of the present invention, there is provided an improved system for selecting the optimum band saw blade for a particular product on a particular band saw.

In accordance with still a further aspect of the present invention, there is provided an improved system for analyzing the cost of producing a particular product using the recommended types of band saw blades.

In accordance with still a further aspect of the present invention, there is provided an improved system for recommending solutions to problems encountered in operating band saws.

The above noted features and advantages of the present invention as well as other superior aspects thereof will be further appreciated by those skilled in the art upon reading the detailed description which follows in conjunction with the drawings.

DETAILED DESCRIPTION OF THE PREFERRED EMBODIMENT

Figure 1:
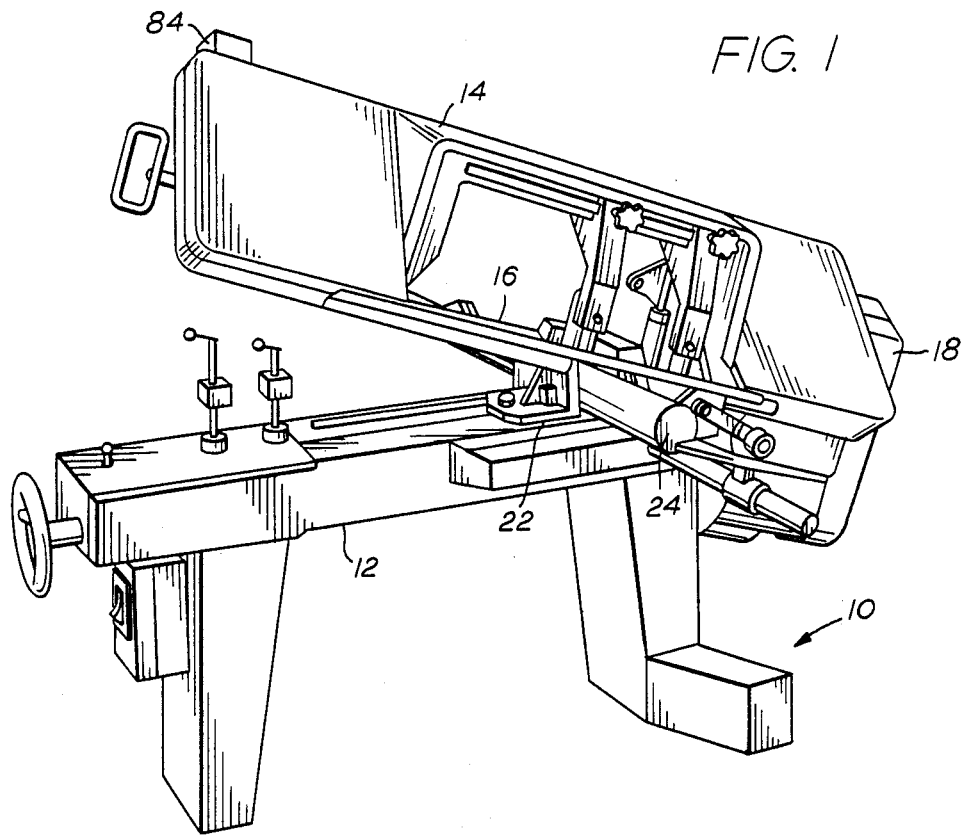
FIG. 1 is a front perspective view of one type of band saw.

In the description which follows, like parts are marked throughout the specification and drawing with the same reference numerals. The drawing figures may illustrate certain components in somewhat schematic form in the interest of clarity and conciseness.

Referring to FIG. 1, there is illustrated a motor-driven band saw 10 which is illustrative of one type of material-cutting machine contemplated for use with the present invention. Motor-driven band saw 10 is a horizontal-blade saw of a type commercially available. It includes a table 12 on which a head 14 is mounted. Head 14 is adapted to support a continuous or endless band saw blade 16 driven over drive and idler pulleys, not shown, by an electric drive motor and transmission means 18 adapted to connect to a source of electrical power by motor power conductors 20. Band saw 10 includes a fixture 22 that is adapted for holding a work piece to be cut such as metal bar stock 24. Head 14 is pivotally mounted on bed 12 to rotate from the position shown generally counter-clockwise through a machine sawing cycle and then return to the position shown to cut a work piece. Saw 10 may also include means for indexing the work piece to a second position for the next cutting cycle. While saw 10 is illustrated as a horizontal band saw, other commonly-known vertical band saws and power hacksaws are also contemplated within the scope of the invention.

The overall efficiency of a metal-cutting saw such as the motor-driven saw 10 is dependent upon several factors. These factors include the type of saw blade and the speed and feed settings on the band saw. Indicative characteristics of the type of saw blade being used are the material of which the blade is made, the blade gauge, teeth per inch of blade, and set of the teeth. Band saw operating parameters also include blade linear or angular cutting speed and the rate of cutting and area cut per unit time. All of the saw blade and machine parameters must be evaluated when addressing the problems of improving cutting efficiency, correcting insufficient cutting rates or detecting machine malfunctions.

Figure 2:
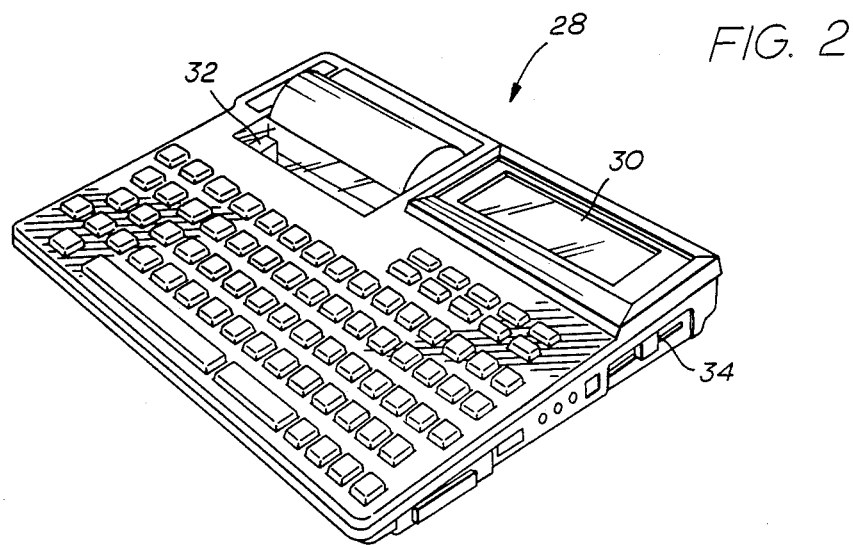
FIG. 2 is a front perspective view of a portable applications computer used to analyze the performance of the band saw of FIG. 1 and provide recommendations for improving its performance.

In accordance with the present invention, a system 26 is provided for selecting a band saw blade 16. FIG. 2 is a perspective view of a computer that is part of the system 26, which includes the band saw 10 and a microprocessor 28. In the preferred embodiment, the microprocessor comprises a Sharp PC 2500 having an integral liquid crystal display 30 and a printer 32. However, in the alternative, the system 26 may utilize a Sharp PC 1350 coat-pocket computer with or without the band saw 10, or it may be provided in the form of software on floppy disks or the like which may be utilized on personal computers or standard main-frame computers. The band saw 10 is shown as having a horizontal blade, but it could equally as well have a vertical blade. The microprocessor 28 includes a memory in the form of a read-only memory or ROM capable of storing digital data. In the present invention, a schedule of predetermined parameters for operating numerous types of bandsaws such as band saw 10 is programmed into the read-only memory of microprocessor 28. In the case of the Sharp PC 2500, the schedule of predetermined parameters is incorporated on a ROM card 34, which is insertable into the microprocessor 28. These parameters include blade length, blade width, blade gauge, saw type by manufacturer and model number, the material to be cut, the shape of the work piece, the dimensions of the work piece, the side of the work piece to be placed on the saw bed, the number of pieces to be cut simultaneously, and the stacking arrangements of the work pieces, tabulated as follows. Tables containing the following data are included in the microfiche and are entered in ROM. A first table lists types of blades and appropriate applications for each. A second table lists the shapes of FIG. 3 and cross-sectional area of each as a function of dimensions. A third table lists blade widths, gauges, and tooth set for each tooth pattern. A fourth table lists the recommended saw blade to use for cutoff, contour, and friction sawing for each of a variety of materials. A fifth table lists recommended numbers of teeth per inch and sawing speeds in surface feet per minute for various tooth patterns, tooth pitches, blade thicknesses, and workpiece materials. A sixth table lists band saws and the required blade by manufacturer and model number. A seventh table lists band saw problems and recommended actions to solve these problems. An eighth table lists equivalent blades of a plurality of manufacturers. All of these tables are available as look-up tables in ROM, and are tabulated in the microfiche appendix. All of these factors are taken into account and a recommended blade model for each specific situation is stored in the memory of the microprocessor. Thus, utilizing the keyboard 36, the identity of the band saw 10 and the specific values for the products to be cut on band saw 10 are entered into the microprocessor 28. The microprocessor 28 contains a software program and certain data which are included as a microfiche appendix to this application. The program uses a look-up table to identify the specific product to be cut from the schedule of those in its memory, the type of band saw, and the type of cut being made. The program also uses a look-up table to provide a recommendation of the optimum band saw blade for cutting this specific product on the band saw 10. A table which lists required blade sizes for a number of machines is contained in the microfiche appendix.

Information from the table as to the length and width of the blades 16 for each of the band saws 10 listed is entered into the microprocessor memory. The appendix also contains a table that lists specific types of blades by width and gauge, the number of teeth per inch, and the tooth design and tooth set. Table 1 is a list of blade types with preferred applications for each. Table 1 is also included in the appendix.

TABLE 1

| Blade Type by Application | |
|---|---|
| BLADE TYPE | APPLICATION |
| Advan-Edge Blade, a trademark for a blade with a hardened edge. | For interrupted cutting where extra shock resistance is required. Reduces vibration, noise and tooth strippage. |
| Bi-Metaloy II Super Matrix Blade, a registered trademark for a blade with an edge of high-speed steel electron welded to an alloy steel back. | For interrupted cuts such as structural steel and tubing. |
| Bi-Metaloy III Blade, a registered trademark for a welded blade that is ground and hardened. | For sawing space-age alloys, hardened materials and stainless steels, as well as mild to medium hard solids. This blade should be used on uninterrupted cuts. |
| Hardback | Provides greater rigidity for more efficient and economical use in most application requiring heavy feed pressures. |
| Hard Edge Hard Back VP | For production cutting of wood brass, aluminum, and plastic. |
| Hard Edge Hard Back Hook Tooth (ETS) | For smooth cuts in wood. Minimizes secondary smoothing operation in wood. |

There are three basic types of sawing: cutoff sawing, contour sawing, and friction sawing. Cutoff sawing is utilized for rapid cutting of numerous pieces or for reducing material to workable pieces. Contour sawing is used for cutting a curved layout line. Friction sawing is a method of sawing that utilizes the friction heat generated by high band saw velocity and heavy feeding force to soften the material, usually ferrous materials, after which the band saw teeth remove the softened material in a plastic state. Materials to be cut include ferrous metals, non-ferrous metals, and non-metals such as plastics and wood. Materials are listed by categories in the microfiche appendix, with a recommended cutting speed for each. Table 2 lists most materials that are commonly cut by band saws.

TABLE 2

| Types of Material Cut by Band Saws | |
|---|---|
| Ferrous Metals | carbon steel, nickel steel, chrome steel, chrome nickel steel, stainless steel, chrome-vanadium steel, high speed steel, hardening steel, manganese steel, molybdenum steel, tungsten steel, vacuum-formed steel alloys, armor plate, gray pig iron, malleable cast iron, high-test cast iron |
| Non-Ferrous Metals | copper, electrolytic copper, beryllium cooper, mild brass, hard brass, mild bronze, manganese bronze, aluminum bronze, phosphor bronze, aluminum, duralumin, nickel, silver, lead, zinc, magnesium |
| Non-Metals | bakelite, plexiglass, cellulose acetate, vinyl resin, polystyrene, molded phenol, paper, textile laminates, asbestos wood laminates, ground wood laminates, asbestos, carbon, compressed paper, compressed wood, hard wood, rubber, neoprene, mica, glass. |

Once the type of sawing is selected, the material type and other values for the specific product are entered into the computer to control entry into a look-up table in ROM so that the microprocessor 28 can provide recommendations as to the optimum band saw blade 16 for cutting the specific products 24 on the band saw 10.

In a preferred embodiment, the recommendations provided by the microprocessor include recommendations as to the number of teeth per inch and the tooth set of the saw blade. The band saw blade may also be identified by manufacturer and model number, if desired. The recommendations may be optimized for any of three different criteria: maximum cutting speed; maximum blade life, and smoothness of finish of the cut.

As indicated above, a schedule of predetermined parameters is entered into the microprocessor. Similarly, means are provided in the form of the keyboard 36 for entering into the microprocessor 28 values for the specific product 24 to be cut on band saw 10. The specific values include the blade width, blade length, and blade gauge, which are usually determined from the type of band saw utilized. The material to be cut, the shape of the work piece to be placed on the saw bed, the number of pieces to be cut simultaneously, and the stacking arrangement of the work piece are also identified in order for the microprocessor to determine the optimum saw blade characteristics.

The microprocessor calculates the optimum number of teeth per inch using the following formula: teeth per inch times the size of the material equals the number of teeth in the work. For mild material, the minimum number of teeth in the work is 3, the optimum is 10 to 20, and the maximum is 34. For hard material, the minimum number of teeth in the work is 6, the optimum number is 12 to 24, and the maximum number is 48. The optimum tooth selection is closest to the midpoint.

Figure 5:
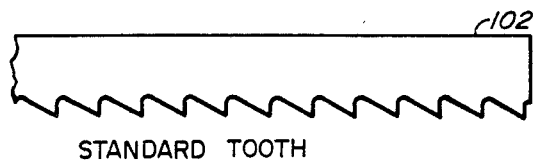
FIG. 5 is a chart showing a variety of tooth patterns and tooth sets available for band saw blades.
Figure 5:
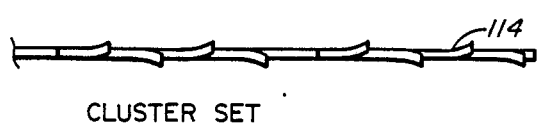
Figure 5:
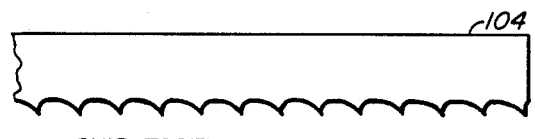
Figure 5:
Figure 5:
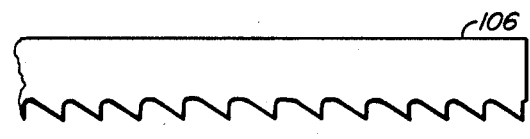
Figure 5:
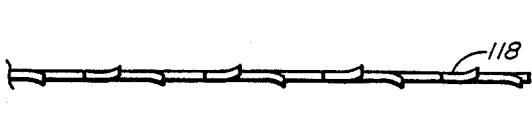
Figure 5:
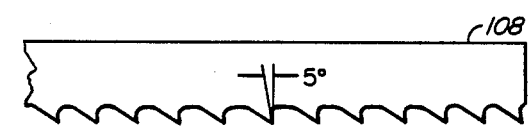
Figure 5:
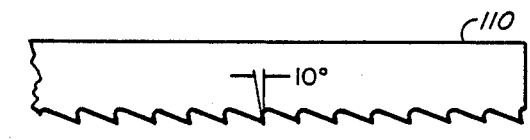
Figure 5:
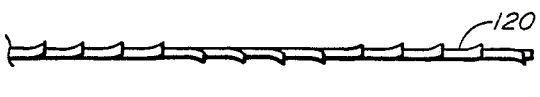
Figure 5:
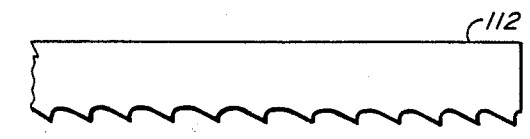

FIG. 5 is a chart of tooth patterns and tooth sets. In a preferred embodiment, six different tooth designs and four different tooth sets are utilized depending on the type of product to be cut. The tooth patterns shown in FIG. 5 are standard pattern 102, skip tooth pattern 104, variable pitch pattern 106, variable pitch 50 hook pattern 108, hook tooth pattern 110, and hook variable pitch pattern 112. Cluster set 114, which has a repeating pattern of five teeth with four teeth set alternately and the fifth tooth unset as a raker. Every tooth set (ETS) 116 has one tooth set one way and the next tooth set the opposite way, with no unset raker. Raker set 118 has one tooth set one way, one tooth set the opposite way, and one straight tooth (raker) to clear the chip. Wavy set 120 has a group of adjacent teeth set to one side followed by a group of adjacent teeth set to the opposite side.

In addition to recommendations as to the type of blade including tooth set and number of teeth per inch, the output from the look-up table may also include the recommended blade speed, cutting rate, break-in blade speed, and break-in cutting rate for the product specified.

Although the present invention is designed principally for selection of band saw blades, the scope of the invention includes use of a system for selection of complex parts for use in a plurality of apparatuses. One example of such an apparatus is a band saw. Other examples include selecting the correct wire size for wrapping wire around an electric terminal, selecting the correct chain for a chain sling for a particular application, selecting the correct size and type of insulated wire for use in electrical equipment, selecting the proper fuses for use in electrical equipment, or selecting files for industrial applications. A microprocessor is provided, such as the microprocessor 28, having means for storing schedules of predetermined parameters for operating apparatuses under a plurality of conditions. A keyboard is provided for entering into the microprocessor specific values for the apparatus under specific conditions. Alternative means of entering data into the microprocessor include an electric light pen on a cathode ray tube, data stored on a floppy disk and inserted into the microprocessor 28, or an electronic communication mechanism such as a computer network or modem. Entry of such data directs the selection of stored parameters from a look-up table to meet stored criteria.

In addition to selecting a band saw blade, a system is provided in the present invention for operating band saws. A specific band saw 10 is provided having an attached blade 16. A plurality of types of substantially identical workpieces, such as bar stock 24, are further provided. Specifications of the saw blade are identified by means of a microprocessor 28, which controls access to a look-up table. A schedule of operating characteristics of the band saw 10 when cutting the specified items 24 is stored in the microprocessor 28. Examples of means for measuring the operating characteristics of the band saw include timers for measuring the period of time in which require for the item to be cut, current-measuring instruments for measuring the maximum number of amps required for a particular cut, and the cutting rate of the band saw, all as disclosed in U.S. patent application Ser. No. 898,090, the parent of the present application. A schedule of predetermined parameters for operating a band saw is stored in the microprocessor. The specifications of the saw blade, including the length, width, gage, tooth set, and teeth per inch, as well as the operating characteristics of the band saw actually measured, are compared to the schedules of predetermined parameters. As a result of this comparison, a recommendation is provided as to the optimum saw blade and optimum operating characteristics, such as blade speed and cutting speed when cutting the substantially identical items. The recommendations of the system may be optimized as to blade wear, cutting speed, or cut finish, as desired.

In one embodiment of the invention, an entire fabricating plant is provided with production monitoring means associated with each band saw. The production monitoring means include switches for measuring the cutting rate, and maximum amps. A central processing system in a form of either a mini or a micro computer is interactive with the production monitoring system. The central processing system includes a memory for storing predetermined operating criteria for each band saw and a program for comparing the performance of each band saw with stored predetermined operating criteria. The microprocessor further provides recommendations for improving the performance of each band saw. These recommendations, as noted above, included preferred band saw blades specified by tooth per inch, tooth set, gauge, operating cutting speed, and blade speed.

Figure 4:
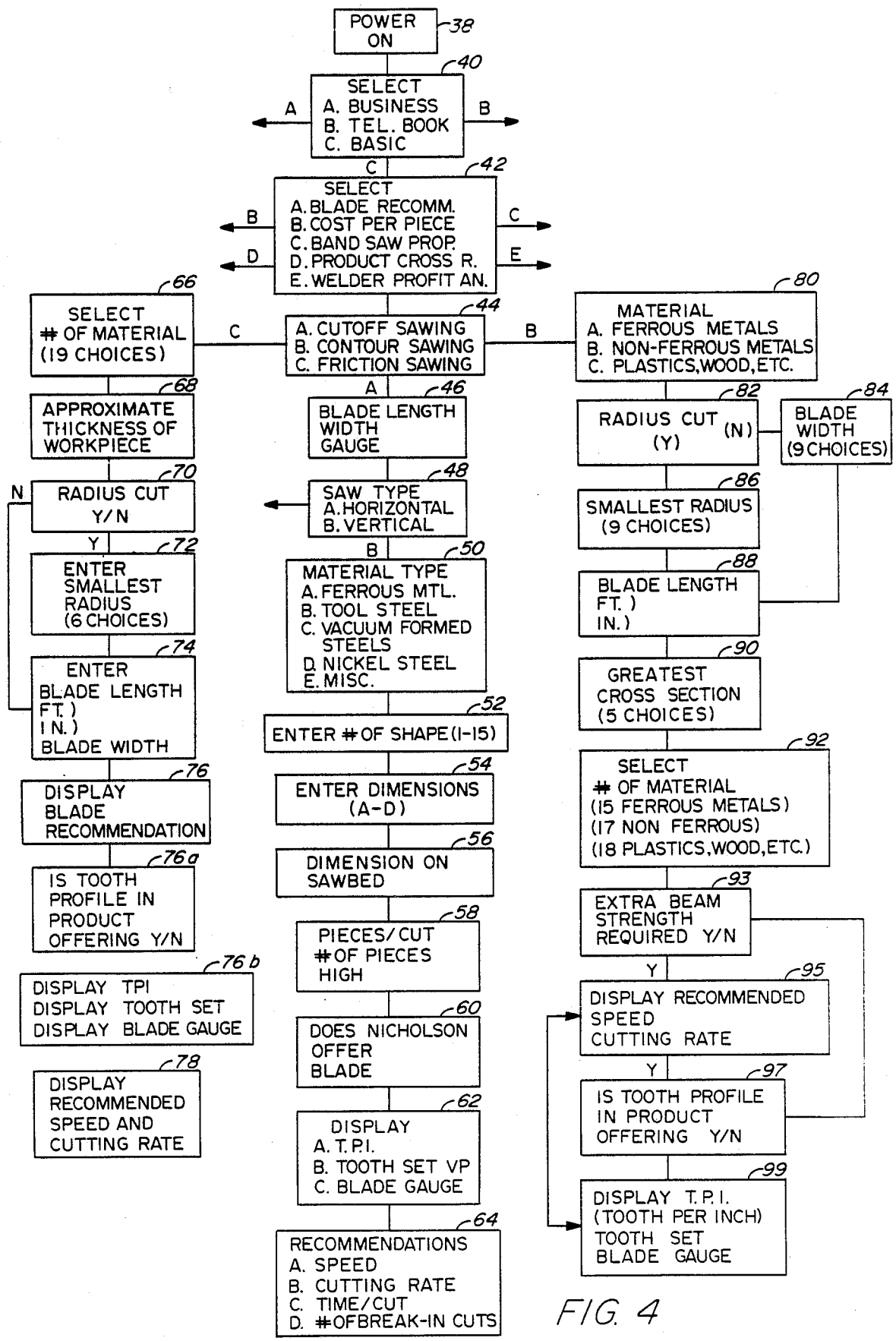
FIG. 4 of the drawings is a flow chart of a blade recommendation analysis using the computer of FIG. 2.

The present invention further includes a method for selecting a band saw blade 16 for cut-off sawing utilizing a microprocessor 28 that is connected to an alphanumeric display 30. The method includes the steps shown in FIG. 4, which is a flow chart of the operation. On a Sharp PC 2500, the power is turned on, as indicated in box 38. A selection of the basic program is then performed in box 40. Once in basic, in the Sharp PC 2500, five separate programs have been provided. These are blade recommendation, cost per piece, band saw properties, product cross reference, and welder profit analysis as seen in box 42. From blade recommendation, the first decision is among cut-off sawing, contour sawing or friction sawing, as indicated in box 44. Once this selection has been made, box 46 selects the blade length, width and gauge utilized on the band saw in question by controlled entry into a look-up table.

Once the blade length, width and gauge are selected, the saw type, (either horizontal or vertical) is entered by box 48. The material type is then selected by box 50 from ferrous metals of several kinds, non-ferrous metals, or non-metals. The shape of the piece to be cut is selected from one of 15 shapes, as indicated in box 52. The 15 shapes may be seen in FIGS. 3a through 3m and will be described herein in more detail. The dimensions of the piece to be cut are then entered as seen in box 54. This is necessary in order to calculate the area of the piece to be cut so as to determine the number of teeth in the work, as indicated above. The dimension of the piece lying on the saw bed must then be indicated, as indicated in box 56. Similarly, the number of pieces per cut and the stacking number are entered into the microprocessor, as indicated in box 58. The microprocessor then directs entry into a look-up table to determine whether or not a blade meeting the requirements is available, and box 60 directs an output displaying this result. The microprocessor 10 then displays the blade type, width, length, teeth per inch, tooth set, and gage recommended in box 62. The microprocessor may then further recommend blade speed, cutting rate, time per cut, and number of break-in cuts, as seen in box 64. Information may be further displayed as to the cutting speed for break-in and cutting rate for break-in. The recommended coolant may also be displayed.

When friction sawing is desired the same steps are performed, as indicated in boxes 38, 40, and 42, but in box 42, friction sawing, item c is selected. As indicated previously, friction sawing is utilized to heat the metals prior to cutting. A selection is then made from the different types of materials that are listed above. Box 66 represents selection of materials. The approximate thickness of the workpiece is then entered into the computer, either by actually measuring the workpiece or estimating, as indicated in box 68. As indicated in box 70, an indication is entered into the computer whether or not a radius cut is to be performed. If a radius cut is to be performed, the smallest radius to be cut is entered into the computer, as indicated in box 72. Ten choices are available, as shown in Table 5. The blade length and width are then entered, as indicated in box 74. A blade recommendation is then displayed, as indicated in box 76. The display may also indicate whether the blade is available (box 76a). The blade recommendation includes the teeth per inch, tooth set, and blade gauge as shown in box 76b. As shown in box 78, recommended speed and cutting rate may also be displayed. Although not shown, recommended break-in speed and cutting rate may further be displayed.

When contour sawing is required, the same steps are performed as indicated above in boxes 38, 40, and 42. However, item b, contour sawing, is selected from the display in box 42. As shown in box 80, 3 different types of material groups are provided of which one is selected. The specific materials are ferrous metals, non-ferrous metals, and non-metals. As shown in box 82, when a radius cut is to be performed, this information is entered. When a radius cut is not to be performed, 9 choices of blades are provided of which one is selected, as shown in box 84. When a radius cut is to be performed, the smallest radius to be cut is indicated in box 86. The blade length in then indicated in box 88. The greatest cross section of the piece is then indicated in box 90. The number of the material to be cut is then entered, as indicated in box 92. An entry as to whether extra beam strength is required for the blade is indicated in box 93. The recommended blade, blade speed, and cutting rate are displayed as indicated in box 95. Whether the blade is available is indicated in box 97. Finally, the recommended blade is displayed by tooth per inch, tooth set, and blade gauge as indicated in box 99.

Figure 3A:
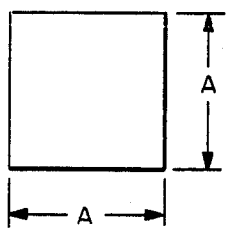
FIGS. 3a through 3m are vertical sections of workpieces to be cut by a band saw such as that of FIG. 1.
Figure 3B:
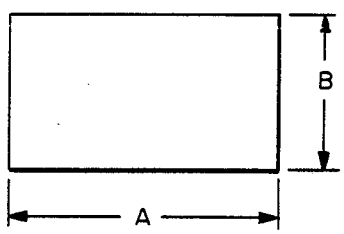
Figure 3C:
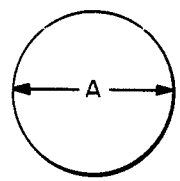
Figure 3D:
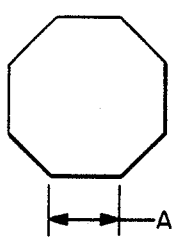
Figure 3E:
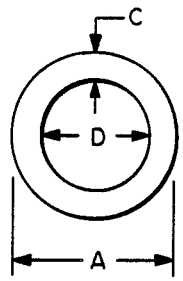
Figure 3F:
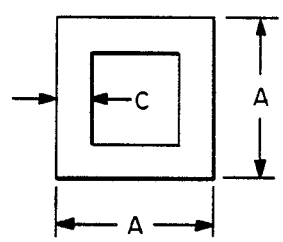
Figure 3G:
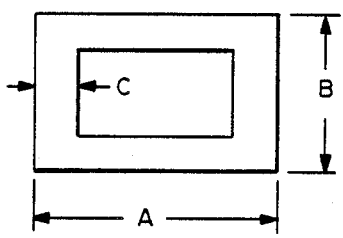
Figure 3H:
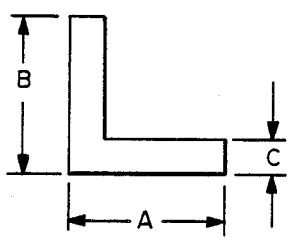
Figure 3I:
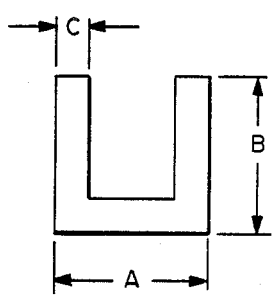
Figure 3J:
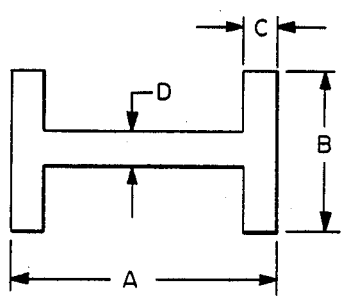
Figure 3K:
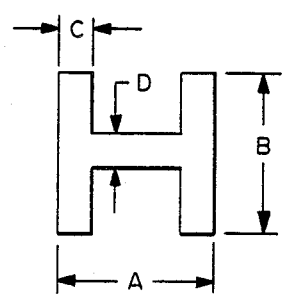
Figure 3L:
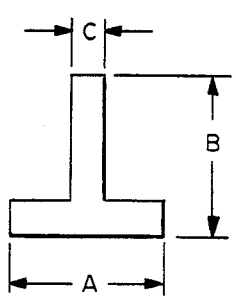
Figure 3M:
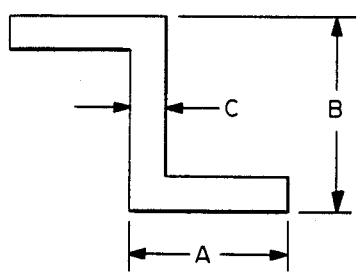

FIGS. 3a–3m illustrate various cross-sections of workpieces to be cut. FIG. 3a is a workpiece having a square solid cross-section with side dimensions A. FIG. 3b is a workpiece of a rectangular solid cross-section having dimensions A by B. FIG. 3c is a solid cylindrical workpiece having a diameter A. FIG. 3d is a hexagonal solid workpiece having a flat side of dimension A. FIG. 3e is a cylindrical tube having major and minor diameters A and D and wall thickness C. FIG. 3f is a tube of square cross-section having outer dimension A and wall thickness C. FIG. 3g illustrates a rectangular tubular workpiece having outer dimensions A and B and a tubing wall thickness C. FIG. 3h is an angle section workpiece having outside dimensions A and B and a section thickness C. FIG. 3i is a channel section having outside dimensions A and B and a section thickness C. FIG. 3j is an I-beam of height A, width B, base thickness C, and web thickness D. FIG. 3k is an H-bar of height and width A, base thickness C, and web thickness D. FIG. 3l is a T-section of width A, height B, and thickness C. FIG. 3m is a Z-section of base width A, height B, and thickness C.

Microprocessor 10 is programmed to calculate the cross-sectional areas of the shapes illustrated in FIGS. 3a through 3m, given the dimensions indicated for each of the respective shapes. In this way, for a given cutting cycle to cut a particular workpiece having one of the shapes illustrated, the total time to make a cut may be recorded. With input to the microprocessor 10 of the dimensions of the piece being cut, the cutting rate in terms of area per unit time may be computed and displayed either on the alphanumeric display 30 or on printer 32.

An additional feature of the invention is a method of correcting band saw problems utilizing microprocessor 28. The method includes the steps of observing the band saw 10 in operation and identifying the relevant problem.

TABLE 3

| Problems with Band Saws | |
|---|---|
| chipped teeth | stripped teeth |
| premature wear | blade breakage |
| crooked cuts | rough cutting |
| back edge of band wedging | blade vibration |
| chips welding to teeth | blade making belly-shaped |
| gullets loading | cuts |
| band develops twist | band develops a negative - |
| band squeals | camber |
| blade not running true | cutting rate too slow |
| against saw guide backup | premature loss of set |
| bearing | band develops positive |
| band stalls in work | camber |
| band scores | |

These problems and their solutions are tabulated in the appendix, which is programmed into the microprocessor 28. The flow chart for band saw problems may be seen in FIG. 6 of the drawings. Entry of a particular problem into microprocessor 10 causes the recommended solution to be displayed on alphanumeric display 30, printer 32, or both.

The present system also includes a method of calculating the comparative cost per piece of competitive band saw blades for a particular type of workpiece utilizing microprocessor 28. A cost per piece is entered and identifying information may be entered. The number of blades used annually and the name of the competitive blade being used is entered. The number of pieces cut with the first competitor's blade, including the number of cuts per blade, the number of pieces per cut, the hourly rate dollar rate for operation of the band saw and the burden rate assigned to the band saw are entered into the microprocessor 10. The microprocessor then calculates the total cost per hour of operating the band saw, according to a program that is listed in detail in the microfiche appendix. The total cost per hour is displayed on the alphanumeric display 30 or the printer 32, or both. The first competitor's blade cost and the second competitor's blade cost are entered. The first competitor's time per cut and the second competitor's time for cut are then entered. The first and second competitors' hourly cost per piece is displayed, burden cost per piece, and total cost for piece. The second competitor's blade is then indicated as saving a calculated amount on this application.

An alternative method is also contemplated in which the first competitor's blade is installed on the band saw 10. The band saw is observed and the number of pieces cut per blade, the time per cut, and the number of pieces cut per hour are measured. The resulting data are entered into the microprocessor. Similarly, the number of blades used annually is entered into the microprocessor. The cost and the time per cut of the first blade are also entered. An optimum band saw blade is then determined using the parameters set forth above, which is designated as the second competitor blade. The number of pieces cut per blade for the second competitor's blade, the time per cut, and the number of pieces cut per hour are calculated. The microprocessor then displays the comparative cost per piece for the first and second blades, the hourly cost per piece, and the annual comparative cost.

The present invention also includes a method of cross-referencing band saw blades in a microprocessor. The method includes the step of entering into the microprocessor a plurality of electronic symbols corresponding to selected band saw blades and corresponding blade lengths and widths, teeth per inch, teeth set and played materials to be cut. This information is included in the microfiche appendix. The microprocessor is then programmed to identify each band saw blade on the basis of substantial identity of blade length, blade width, teeth per inch, and blade material. Thus, when a signal is entered into the microprocessor identifying a selected one of the band saw blades, the microprocessor displays one or more band saw blades that are equivalent to the selected band saw blade.

A further aspect of the present invention is a method of cross-referencing band saw blades utilizing a microprocessor having an alphanumeric display. The term product cross reference is entered into the microprocessor, as indicated in box 40 of FIG. 4. The microprocessor is programmed with the plurality of band saw blades, grouped by manufacturer, and blade type, as shown in Tables 3A–3H. This information in included in the microfiche appendix. The name of the manufacturer of the band saw and the band saw type is entered into the microprocessor and the microprocessor through the alphanumeric display 30 displays the name of one or more recommended blades.

An additional aspect of the invention is a method for comparative cost analysis of competitive complex parts utilizing a microprocessor 28. For products such as chains, fuses, and wire for wire wrapping, the comparative performance of the complex part is measured in its intended work environment, and the data is entered into the microprocessor. Also entered into the microprocessor is the hourly cost and burden rate for use of the competitive complex parts. The microprocessor then calculates and displays the competitive costs for the individual competitive complex parts, comparative hourly costs, and the comparative annual cost.

The description given here of the preferred embodiment is intended to set forth the best mode known for the practice of the invention. It should be taken as illustrative and not as limiting, and the scope of the invention should be limited only by the appended claims and their equivalents.

What is claimed is:

1. A method of selecting a blade for a material cutting machine such as a motor driven band saw, the method comprising:
    storing in a ROM descriptive data about blades, saws, and workpieces;
    entering into a microprocessor that is coupled to the ROM identifying parameters about a particular band saw and a particular workpiece;
    selecting data identifying an optimum blade for the particular band saw and the particular workpiece according to the identifying parameters; and
    displaying information identifying the optimum blade.

2. The method of claim 1 wherein said descriptive data are selected from the group consisting of blade length, blade width and blade gauge, tooth pattern, saw type, material of the workpiece, shape of the workpiece, dimensions of the workpiece, side of the workpiece to be placed on the sawbed, number of pieces to be cut simultaneously, stacking arrangement of the workpieces and recommended blade model.

3. The method of claim 1 wherein said identifying parameters for a specific workpiece to be cut on said band saw are selected from the group consisting of blade width, blade length, blade gauge, saw type, material of the workpiece, shape of the workpiece to be placed on the sawbed, number of pieces to be cut simultaneously and stacking arrangement of the workpieces.

4. The method of claim 1 wherein the information comprises the blade material, tooth pattern, tooth set, and operating speed in surface feet per minute.

5. The method of claim 1 wherein said descriptive data comprises blade lengths, blade widths, blade gauges, saw types, tooth patterns, tooth sets, materials of the workpieces, shapes of the workpieces, stacking arrangements of the workpieces, manufacturers of the blades, costs of the blades.

6. The method of claim 5 wherein the step of displaying comprises in addition displaying comparative costs of various blades.

7. The method of claim 5 wherein said descriptive data comprises in addition a list of band saw problems and a solution to each.

8. The method of claim 7 wherein the identifying parameters comprise in addition a particular band saw problem.

9. The method of claim 8 comprising in addition displaying the particular band saw problem and the solution to that problem.

10. An apparatus for selecting a blade for a material cutting machine such as a motor driven band saw comprising:
    a microprocessor;
    a ROM connected operationally to the microprocessor;
    means for storing in the ROM descriptive data about blades, saws, and workpieces;
    means for entering into the microprocessor identifying parameters about a particular band saw and a particular workpiece;
    means for selecting data identifying an optimum blade for the particular band saw according to the identifying parameters; and
    means for displaying information identifying the optimum blade.

11. The apparatus of claim 10 wherein said descriptive data are selected from the group consisting of blade length, blade width and blade gauge, tooth pattern, saw type, material of the workpiece, shape of the workpiece, dimensions of the workpiece, side of the workpiece to be placed on the sawbed, number of pieces to be cut simultaneously, stacking arrangement of the workpieces and recommended blade model.

12. The apparatus of claim 10 wherein identifying parameters for a specific workpiece to be cut on said band saw are selected from the group consisting of blade width, blade length, blade gauge, saw type, material of the workpiece, shape of the workpiece to be placed on the sawbed, number of pieces to be cut simultaneously and stacking arrangement of the workpieces.

13. The apparatus of claim 10 wherein the information comprises the blade material, tooth pattern, tooth set, and operating speed in surface feet per minute.

14. The apparatus of claim 10 wherein said descriptive data comprises blade lengths, blade widths, blade gauges, saw types, tooth patterns, tooth sets, materials of the workpieces, shapes of the workpieces, stacking arrangements of the workpieces, manufacturers of the blades, costs of the blades.

15. The apparatus of claim 14 wherein the means for displaying comprises in addition means for displaying comparative costs of various blades.

16. The apparatus of claim 14 wherein said descriptive data comprises in addition a list of band saw problems and a solution to each.

17. The apparatus of claim 16 wherein the identifying parameters comprise in addition a particular band saw problem.

18. The apparatus of claim 17 consisting in addition means for displaying the particular band saw problem and the solution to that problem.

19. A method of selecting a complex part such as a blade for a material cutting machine or the like, the method comprising:

storing in a ROM descriptive data about the complex part and other like complex parts;
entering into a microprocessor that is coupled to the ROM identifying parameters about a particular application using the complex part;
selecting data identifying an optimum complex part for the particular application according to the identifying parameters; and
displaying information identifying the optimum complex part.

20. An apparatus for selecting a complex part comprising:

means for storing in the ROM descriptive data about the complex part and other like complex parts;
means for entering into the microprocessor identifying parameters about a particular application using the complex part;
means for selecting data identifying an optimum complex part for the particular application according to the identifying parameters; and
means for displaying information identifying the optimum complex part.

* * * * *